(12) United States Patent
Falco et al.

(10) Patent No.: US 11,580,164 B1
(45) Date of Patent: Feb. 14, 2023

(54) ONTOLOGY-BASED TIME SERIES VISUALIZATION AND ANALYSIS

(71) Applicant: Palantir Technologies Inc., Palo Alto, CA (US)

(72) Inventors: Xavier Falco, London (GB); John McRaven, New York, NY (US); Spencer Tank, New York, NY (US); Shuyang Li, Fremont, CA (US); Mikhail Proniushkin, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/661,778

(22) Filed: Oct. 23, 2019

Related U.S. Application Data

(60) Provisional application No. 62/758,352, filed on Nov. 9, 2018.

(51) Int. Cl.
| | | |
|---|---|---|
| G06F 16/36 | (2019.01) | |
| G06T 11/20 | (2006.01) | |
| G06F 16/901 | (2019.01) | |
| G06F 16/383 | (2019.01) | |
| G06F 16/338 | (2019.01) | |

(52) U.S. Cl.
CPC ........ *G06F 16/9024* (2019.01); *G06F 16/338* (2019.01); *G06F 16/367* (2019.01); *G06F 16/383* (2019.01); *G06T 11/206* (2013.01)

(58) Field of Classification Search
CPC ...... G06F 3/048; G06F 3/0482; G06F 3/0484; G06F 3/04842; G06F 16/9024; G06F 16/367; G06F 16/338; G06F 16/383; G06T 11/206

USPC .......................................................... 715/700
See application file for complete search history.

(56) References Cited

U.S. PATENT DOCUMENTS

| | | | | |
|---|---|---|---|---|
| 2009/0083195 | A1* | 3/2009 | Aymeloglu | G06Q 10/04 705/36 R |
| 2010/0070426 | A1* | 3/2010 | Aymeloglu | G06F 16/283 705/36 R |
| 2010/0070427 | A1* | 3/2010 | Rakhamimov | G06Q 40/06 707/E17.014 |
| 2010/0070489 | A1* | 3/2010 | Aymeloglu | G06F 16/2428 707/E17.001 |

(Continued)

*Primary Examiner* — Reza Nabi
*Assistant Examiner* — Hwei-Min Lu
(74) *Attorney, Agent, or Firm* — Knobbe, Martens, Olson & Bear, LLP

(57) ABSTRACT

Methods and systems for presenting time series for analysis. A method may receive a first input defining a metric that indicates a relationship between a first and a second time series that are each associated with at least a first data object of a plurality of data objects, generate a first plot depicting the metric as determined from the first and the second time series, receive, via the user interface, a second input of a selection of a second data object of the plurality of data objects, determine, via an ontology, a relationship of the second data object with a third and a fourth time series that, respectively, are associated with series types that match series types associated with the first and the second time series, and generate and display, in the user interface, a second plot depicting the metric as determined from the third and the fourth time series.

16 Claims, 10 Drawing Sheets

(56) References Cited

U.S. PATENT DOCUMENTS

| | | | |
|---|---|---|---|
| 2010/0318934 A1* | 12/2010 | Blevins | G05B 19/41875 700/110 |
| 2011/0300023 A1* | 12/2011 | Cox | A23B 5/0052 422/109 |
| 2012/0030140 A1* | 2/2012 | Aymeloglu | G06Q 40/00 705/36 R |
| 2012/0083917 A1* | 4/2012 | Zhou | G05B 19/41875 700/110 |
| 2013/0060603 A1* | 3/2013 | Wagner | G06Q 30/0202 705/7.29 |
| 2013/0103657 A1* | 4/2013 | Ikawa | G06F 16/2477 707/693 |
| 2015/0019537 A1* | 1/2015 | Neels | G06F 16/334 707/722 |
| 2016/0098176 A1* | 4/2016 | Cervelli | G06T 11/206 715/804 |
| 2019/0392032 A1* | 12/2019 | Yasui | G06F 40/18 |

* cited by examiner

ONTOLOGY-BASED TIME SERIES VISUALIZATION AND ANALYSIS

TECHNICAL FIELD

The present disclosure relates to systems and techniques for data integration, visualization, and analysis. More specifically, this disclosure relates to providing an ontology-based complex analysis on a time series, and then efficiently perform a similar analysis on one or more other time series.

BACKGROUND

Systems monitoring events, processes or operations of a system can collect data in a time series, which includes numerous data samples and a corresponding time indication of when each data sample was collected. In different contexts, a time series data set includes a collection of the time series data from one or more inputs that can correspond to a grouping of a series of events that may occur, for example, in a system, plant, or factory. Multiple related time series data sets may be collected for a similar series of events. For example, monitoring a process during different runs of the process, monitoring aspects of a transportation system that moves over the same path hourly or daily, monitoring information related to the stock market throughout each day. Accordingly, it may be desired to perform the same type of analysis on the different multiple data sets for the similar series of events.

In some cases, the analysis for a time series data includes defining a metric that is calculated based on two or more of the data values in the time series data set calculations, and displaying the metric as a function of time on a plot. In another analysis, a user may need to create a search of a time series data set that produces a plot-based analysis. However, existing user interfaces require that such metric definition, and searching, be created each time, and this repetitive setup using a time series user interface is a slow and tedious process for a user. Accordingly, it would be useful for a system to be able to perform plot-based analysis on a time series, and then once the analysis is defined, perform similar analysis on one or more other time series.

SUMMARY

Embodiments of systems and methods of a time-series interaction and analysis user interface are disclosed herein. A software application provides a user interface and workflow for interacting with and visualizing time series data sets, including chart templating functionality enabled by an ontology that defines relationships among data types. Multiple time-series data sets can be stored according to an ontology. In various operational work-flows, a user may generate, via the user interface, a chart-based analysis of a first time series associated with a first data object, and then, utilizing the ontology, pivot the chart-based analysis to a second time series associated with a second data object. In other operations, the user may define search conditions the produce a chart-based analysis of time series associated with a data object, and then, utilizing the ontology, apply the same search conditions to a set of time series that are associated with other data objects.

In various embodiments of an innovation, a system includes one or more non-transitory computer storage mediums configured to store at least a plurality of data objects, the data objects associated with respective object types, a plurality of time series, the time series associated with respective series types, the time series further associated with respective data objects, an ontology defining relationships among object types and series types, and computer-executable instructions. The system also includes one or more computer hardware processors in communication with the one or more non-transitory computer storage mediums, the one or more computer hardware processors configured to execute the computer-executable instructions to at least: cause presentation of a user interface configured to receive a first user input defining a metric that indicates a relationship between at least a first time series and a second time series that are each associated with at least a first data object of the plurality of data objects, generate and display, in the user interface, a first plot depicting the metric as determined from the first time series and the second time series, receive, via the user interface, a second user input comprising a selection of a second data object of the plurality of data objects, determine, via the ontology, a relationship of the second data object with a third time series and a fourth time series that, respectively, are associated with series types that match series types associated with the first time series and the second time series, and generate and display, in the user interface, a second plot depicting the metric as determined from the third time series and the fourth time series.

Such systems may include other one or more other aspects in various embodiments. In some embodiments, the one or more computer hardware processors are further configured to execute the computer-executable instructions to determine the series types of the first time series and the second time series, and determine, via the ontology, the third time series and the fourth time series based on the second data object and the determined series types of the first time series and the second time series. In some embodiments, the one or more computer hardware processors are further configured to execute the computer-executable instructions to generate and display, in the user interface, a third plot representative of the first time series and a fourth plot representative of the second time series. In some embodiments, the one or more computer hardware processors are further configured to execute the computer-executable instructions to generate and display, in the user interface, the first plot, the third plot, the fourth plot simultaneously and temporally aligned. In some embodiments, the one or more computer hardware processors are further configured to execute the computer-executable instructions to receive, via the user interface, a user selection that identifies the first time series and second time series. In some embodiments, the one or more computer hardware processors are further configured to execute the computer-executable instructions to generate and display a fifth plot representative of the third time series, and a sixth plot representative of the fourth time series. In some embodiments, the one or more computer hardware processors are further configured to execute the computer-executable instructions to generate and display, in the user interface, the fifth plot, the sixth plot, and the second plot simultaneously and temporally aligned. In some embodiments, the one or more computer hardware processors are further configured to execute the computer-executable instructions to receive, prior to receiving the second user input, one or more additional user inputs changing the defined metric, and generate and display, in the user interface, the first plot depicting the metric as defined by the one or more additional user inputs. In some embodiments, the one or more computer hardware processors are further configured to execute the computer-executable instructions to generate and display, in the user interface, the second plot and first plot temporally aligned on the same graph.

In various embodiments of an innovation of a method for presenting and analyzing time series, the method may include causing presentation of a user interface configured to receive a first user input defining a metric that indicates a relationship between at least a first time series and a second time series that are each associated with at least a first data object of a plurality of data objects, generate and display, in the user interface, a first plot depicting the metric as determined from the first time series and the second time series, receive, via the user interface, a second user input comprising a selection of a second data object of the plurality of data objects, determine, via an ontology, a relationship of the second data object with a third time series and a fourth time series that, respectively, are associated with series types that match series types associated with the first time series and the second time series, and generate and display, in the user interface, a second plot depicting the metric as determined from the third time series and the fourth time series. Such methods may be performed by one or more computer hardware processors configured to execute computer-executable instructions on a non-transitory computer storage medium.

Such methods may include other one or more other aspects in various embodiments. In some embodiments, the method further includes determining the series types of the first time series and the second time series, and determining, via the ontology, the third time series and the fourth time series based on the second data object and the determined series types of the first time series and the second time series. In some embodiments, the method further includes generating and displaying, in the user interface, a third plot representative of the first time series and a fourth plot representative of the second time series. In some embodiments, the method further includes generating and displaying, in the user interface, the first plot, the third plot, the fourth plot simultaneously and temporally aligned. In some embodiments, the method further includes receiving, via the user interface, a user selection that identifies the first time series and second time series. In some embodiments, the method further includes generating and displaying a fifth plot representative of the third time series, and a sixth plot representative of the fourth time series. In some embodiments, the method further includes generating and displaying, in the user interface, the fifth plot, the sixth plot, and the second plot simultaneously and temporally aligned. In some embodiments, the method further includes receiving, prior to receiving the second user input, one or more additional user inputs changing the defined metric, and generating and displaying, in the user interface, the first plot depicting the metric as defined by the one or more additional user inputs.

In various embodiments, another innovation of a system for presenting and analyzing time series may include one or more non-transitory computer storage mediums configured to store at least a plurality of data objects, the data objects associated with respective object types, a plurality of time series, the time series associated with respective series types, the time series further associated with respective data objects, an ontology defining relationships among object types and series types, and computer-executable instructions, and one or more computer hardware processors in communication with the one or more non-transitory computer storage mediums, the one or more computer hardware processors configured to execute the computer-executable instructions to at least cause presentation of a user interface configured to receive a first user input, receive, via the user interface, a first user input comprising a selection of a first data object, receive, via the user interface, a second user input comprising a selection of a search condition for searching a first time series of the plurality of time series, generate and display, in the user interface, a first plot depicting the result of the search condition applied on the first time series, receive, via the user interface, a third user input comprising a selection of a set of one or more second data objects, determine, via the ontology, a relationship of each of the one or more second data objects in the set with respective one or more second time series associated with series types that match series types associated with the first time series, and generate and display, in the user interface, one or more second plots depicting the result of the search condition applied on the one or more second time series.

Such systems may include other one or more other aspects in various embodiments. In some embodiments, the one or more second plots comprises two or more second plots, and the one or more computer hardware processors are further configured to execute the computer-executable instructions to generate and display, in the user interface, the two or more second plots in the user display simultaneously. In some embodiments, the one or more second plots comprises two or more second plots, and the one or more computer hardware processors are further configured to execute the computer-executable instructions to generate and display, in the user interface, the two or more second plots in the user display as a function of events, the events being a series of events associated with each time series.

In various embodiments of an innovation of a method for presenting and analyzing time series, the method performed on a system having one or more computer hardware processors in communication with the one or more non-transitory computer storage mediums, one or more computer hardware processors configured to execute the computer-executable instructions, one or more non-transitory computer storage mediums configured to store at least a plurality of data objects, the data objects associated with respective object types, a plurality of time series, the time series associated with respective series types, the time series further associated with respective data objects, an ontology defining relationships among object types and series types, and the computer-executable instructions. In various embodiments, the method includes causing presentation of a user interface configured to receive a first user input, receiving via the user interface a first user input comprising a selection of a first data object, receiving via the user interface a second user input comprising a selection of a search condition for searching a first time series of the plurality of time series, generating and displaying in the user interface a first plot depicting the result of the search condition applied on the first time series, receiving via the user interface a third user input comprising a selection of a set of one or more second data objects, determining via the ontology a relationship of each of the one or more second data objects in the set with respective one or more second time series associated with series types that match series types associated with the first time series and generating and displaying in the user interface one or more second plots depicting the result of the search condition applied on the one or more second time series.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described herein in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
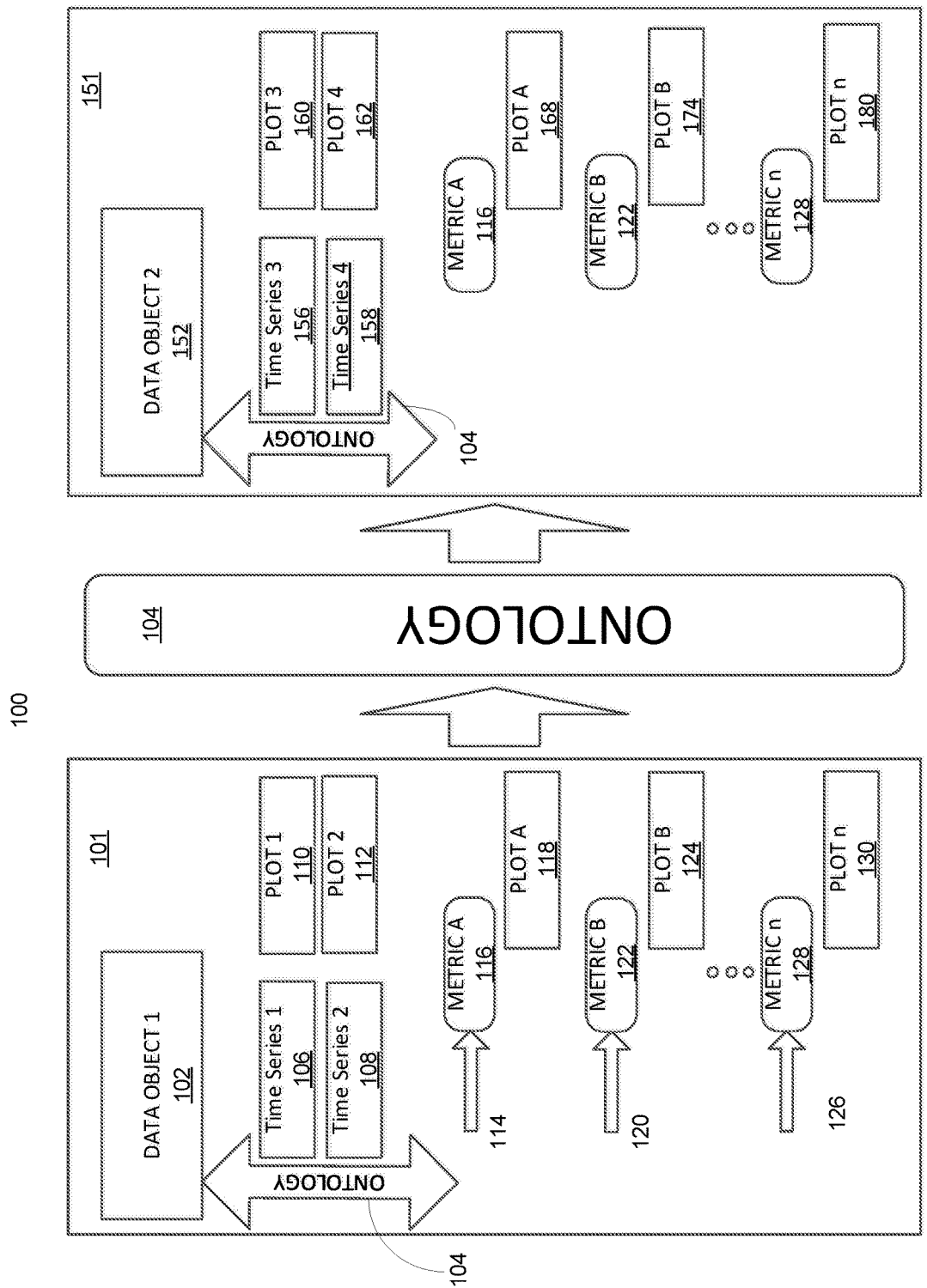
FIG. 1 is a schematic illustrating an example of a functionality that may be incorporated in a system or method for templating series data associated with a data object using a metric, and using an ontology defining relationships among the data types to pivot the plot-based analysis to other time series data sets associated with a second data object to produce a plot defined by the same metric.

Time series data includes a collection of data (e.g., sensor data, financial data, counts of events) collected over a period of time that may occur, for example, in a computer, system, plant, or factory. Multiple related time series data sets may be collected for a similar series of events (e.g., monitoring a process during different runs of the process). Accordingly, it may be desired to perform the same type of analysis on the multiple data sets for the similar series of events. In some cases, the analysis for a time series data includes defining a metric that is calculated based on two or more of the data values in the time series data set calculations, and displaying the metric as a function of time on a chart. In another analysis, a user may need to create a search of a time series data set that produces a chart-based analysis. However, existing user interfaces require that such metric definition, and searching, be created each time, and this repetitive setup using a time series user interface is a slow and tedious process for a user.

A software application that provides a user interface and workflow for interacting with and visualizing time series data sets. The user interface includes chart templating functionality enabled by an ontology that defines relationships among data types. In operation, multiple time-series data sets can be stored according to an ontology. The user may generate, via the user interface, a chart-based analysis of a first time series data set, and then, utilizing the ontology, pivot the chart-based analysis to a second time series data set. Further, the user may define a search the produces a chart-based analysis, and then, utilizing the ontology, apply the search to a set of related time series (thereby generating an aggregate chart-based analysis of the set).

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium, component, and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a batch (see below), a sensor, a person, a place, an organization, a market instrument, or other noun. A data object can represent an event or a group of events that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Batch Type, Sensor Type, Person, Event, or Document). Object types may be defined by an ontology and may be modified or updated to include additional object types. An object definition (e.g., in an ontology) may include how the object is related to other objects, such as being a sub-object type of another object type (e.g., a particular batch type can be associated with one or more other sensor types, or an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Batch: As used herein is a broad term that refers to something that changes over time. A batch generally is associated with a start time and an end time, and may be monitored over a time period to collect data, the data being associated with a time during the batch (e.g., collected at an instance of time, or collected during a period of time during the batch). Time series data is an example of data that may be associated with a batch. In one example, a batch may refer to a process where a material or substance is subject to one or more events (or processes) that cause one or more changes to the material or substance, for example, a grouping of related events processes or operations may comprise a batch. In another example, a batch may refer to the occurrence of a certain thing, a certain event, or portion of an event, that occurs numerous times. For example, the event of a train traveling from Chicago to Milwaukee may be referred to as a batch, and information that occurs on the train relating to the train itself (e.g., mechanical information), or to anything that happens on the train (e.g., passengers getting on and off, money spent in the restaurant car, communications made via the trains Wi-Fi network, etc.) can be part of the data collected for the batch.

In another example, the instances when a submarine submerges between 33 feet and 330 feet may be referred to as a batch, and during such a batch numerous data may be collected regarding the equipment operating on the submarine, or information relating to integrity of the hull maybe collected. In another example, a batch may refer to a circumstance or situation when a system, or a portion of a system, operates and is monitored over a period of time. In another example, a car driving from point A to Point B, or for a certain duration of time, can be referred to as a batch. Similarly, a system operating (e.g., to heat water, refine oil, make food products, travel from point A to point B, etc.) may be referred to as a batch. In another example, the processing of a material (any substance, e.g., water, beer, concrete, oil, produce, paint, etc.) being operated on by a system may also be referred to as a batch. One or more sensors or processes can be used to collect data associated with a batch, and/or one or more users can monitor a batch and provide input to a batch.

A portion of an event or process may also be referred to batch if information is collected during the event or process. For example, a batch may refer to a baseball pitch/hit event, where a movement of a baseball (e.g., position, velocity, trajectory, rotation, etc.) is monitored as it travels from the pitcher's hand to the batter, and then from the batter's bat to the outfield. A batch may also refer to a portion of the baseball pitch/hit event, for example, only the portion from where a bat hits the baseball and the baseball travels to the outfield. In some cases, batch data may be collected for a baseball pitch/hit event and then later it is decided to look at a portion of the collected data as a separate batch, for example, only the portion of the movement of the baseball after the baseball is hit by the bat. In such cases, the pitch/hit batch can be analyzed by storing as separate metadata the exact start and end times of each time during a game a baseball leaves the pitcher's hand, gets hit by the bat and travels to the outfield during a pitch/hit event. Subsequently, a search can be done on the pitch/hit event batch data to identify a set of start/stop times when the baseball is hit by the bat and has traveled 100 feet from the batter, and those can be considered to be a set of batches and analyzed.

In some embodiments, a user can also monitor a batch and characterize the batch at one or more time instances over a period of time, e.g., characterize the quality of the batch, or how well the batch is operating. In some embodiments, additional information relating to the batch may be determined. For example, determined information may be generated by a combination of data from two or more sensors, or by taking a sample of a substance that is associated with the batch and performing quality analysis of the substance. In another example, determined information may be generated by a combination of data from one or more sensors and user input (e.g., a user input characterizing quality). A batch may be represented as a data object, or as a collection of data objects, where characteristics of the batch, (e.g., identification, start time, end time, time series data collected by each sensor, and the like) may be represented as a data object.

Event: An occurrence that takes place over a time period, where time series data can be collected during the occurrence. An event may have a start time and/or an end time, or at least an indicated (or identified) start time and/or end time. An event generally occurs at a location. For some events, the location may cover a large geographic area. For example, an earthquake, ocean tides, and a space station falling out of orbit are examples of events that may occur across a large geographic area, and including above and below the earth's surface. For some other events, the location may be at a specific place, for example, a factory, an office, a home, outside or at a business. For example, baking a cake, the operation of an autonomous vehicle on a route, the actuation of a valve in a cooling system, heating liquid in a container, a cutting operation on a piece of industrial equipment, a particular operation of a system (or machinery) in a facility, a lap of a motorcycle around a race track, and a homerun are examples of events that occur that can occur at a specific place. An event may be characterized by two or more portions that may be referred to as sub-events or phases of the event. In some examples, a batch may undergo a change during one or more events.

Time Series Data: A series of information referenced to time. For example, a series of information that is sensed, collected, determined, and/or stored over a period of time, such that the information may be referenced by the time that it was sensed, collected, determined, and/or stored. As used herein in reference to time series data, "information" is a broad term that may include sensor information and/or other types information that is collected either in reference to an instance of time or during a defined time period (e.g., milliseconds, seconds, minutes, hours, days, weeks, months, years, etc.). Time series data can include the number of times an event occurs during a time period. Some examples of time series data are provided here, but these examples are not meant to limit the type of information that can be included in time series data. In some examples, time series of information may be generated by a sensor monitoring a characteristic, for example, temperature, pressure, pH, light or radiation, dissolved oxygen, carbon dioxide, gas composition, size, vibration, or movement. In some examples, time series data may be a count of a certain occurrence over a designated period of time, e.g., the number of people that pass through a turnstile every minute during a week; the number of cars that travel past a certain location in a city every five minutes for a year; the count of telephone calls a call center during consecutive 15 minute periods for a year; and the amount of money all the cash registers of a store collect during 30 minute time periods for a year; or the number of times a certain computer operation occurs (e.g., an error log or message is generated, a query is made, a certain communication is made) in a certain time period. In some examples, the series of information is determined by using data from one sensor and other information, for example, data from another sensor or stored data. In another example the series information is determined by a user's input, for example, where the user input is a quality characterization. Time series data, or a time series data set, may also be referred to herein simply as "time series."

Ontology-Based Time Series Visualization and Analysis

FIG. 1 is a schematic 100 illustrating an example of operations and functionality that may be incorporated in a system or method for templating series data associated with a data object using a metric, and using an ontology defining relationships among the data types to pivot the plot-based analysis to other time series data sets associated with a second data object to produce a plot defined by the same metric. Additional description applicable to the data objects 102, 152, the ontology 104, and time series data sets 106, 108, 156, and 158 is provided above with respect to the specific terms, and also in reference to FIGS. 3-5 below. An example of a user interface that facilitates the operations and functionality described in reference to FIG. 1 is described in reference to FIG. 8.

The schematic 100 illustrates a first portion 101 of operation and functionality, a second portion 151 of operation and functionality, and a representation of an ontology 104. The use of the terms "first portion" and "second portion" are merely for ease of reference and clarity of description. In reference to FIG. 1, the first portion 101 generally refers to operations and functionality of determining a search plot template, and the second portion 151 generally refers to operation and functionality of displaying plots and information resulting from operations of the first portion 101. For example, using a computational tree that defines the first data objects and associated time series in the first portion 101 on a second data object and its similarly associated time series.

Still referring to FIG. 1, first portion 101 illustrates to functionality for receiving a user input defining a metric that indicates relationship between at least a time series that are associated with a first data object, and receiving a user input selecting a second data object. A first data object 102 is associated with a first time series 106 and a second time series 108 by the ontology 104. The ontology 104 defines relationships between the first data object 102 in the time series 106, 108, for example relationships among object types of the data object 102 and series types of the time series 106, 108. In operation, after a first data object 102 is selected, time series that are associated with the first data object 102 may be displayed on a user interface and selected for analysis. The first time series 106 may be represented by a first plot 110. The second time series 108 may be represented by a second plot 112. The plots 110, 112, and one or more additional plots, may be presented on the user interface to help an analyst consider what information may be useful to extract from the time series that are related to the first data object 102.

The first portion 101 also illustrates an input 114 may be received by a user interface, the input 114 defining a metric A 116 that specifies how time series information from the first time series 106 and the second time series 108 is used to generate a first metric plot 118. As an example to illustrate this functionality, the first data object 102 may be a company name, the first time series 106 may be the opening price of the company's stock over a time period, and the second time series 108 may be the closing price of the company stock over at least a portion of the same time. The metric A 116 may be defined as the opening stock-price minus the closing stock-price. In this example, the first plot 110 would represent the company's open stock price over time, the second plot 112 would represent the company's closing stock-price over time, and the first metric plot 118 would represent the opening stock-price minus the closing stock-price over time. As an analyst considers the time series plots 110, 112 and resulting first metric plot 118, the analyst may want to redefine the metric to extract different information. Accordingly input 120 may be received by a user interface, the input 120 revising the metric such that the resulting second metric plot 124 displays new information. As an analyst reviews and considers what data to extract from time series, an analyst may make additional inputs 126 defining other metrics 128, and these additional inputs are received by the user interface and plots 130 generated and displayed to show the results of using the other metrics 128.

The second portion 151 relates to generating and displaying in the user interface a second plot depicting the metric as determined from time series data associated with the second data object 152. Once the analyst is satisfied with the resulting metric plot, another user input may be received selecting a second data object 152. The system then determines, via the ontology, a relationship of the second data object with a third time series 156 and a fourth time series 158 that, respectively, are associated with series types that match series types associated with the first time series 106 and the second time series 108. The second data object 152 is illustrated in the second portion 151, and is linked by an ontology 104 to the third time series 156 and the fourth time series 158. Plot 160 and plot 162 are representative of the third time series 156 and the fourth time series 158, respectively. Through the selection of the second data object 152, plot 160 and plot 162 may be displayed in the user interface. Using the ontology 104, plot 168 corresponding to the second data object 152 and metric A 116 may also be displayed in the user interface. In this way, the work that an analyst performed in defining a certain plot 118, based on a certain metric 116 in reference to the first data object 102 and a first time series 106 and a second time series 108, is used to efficiently generate and display, for a second data object 150, a plot 168 similar to plot 118 resulting from the same metric 116 but used with respect to the third time series 156 and the fourth time series 158. In some embodiments, other plots 124, 130 that were generated for the first data object 102 using respective metrics 122 and 128, may be similarly displayed in a user interface as plots 174, 180 with respect to the second data object 152 to provide the analyst with additional data to consider.

Again using the stock price example, the second data object 152 may be a second company name, the third time series 156 may be the opening price of the second company's stock over a time period, and the fourth time series 158 may be the closing price of the company stock over time.

The metric A 116 was defined as the opening stock-price minus the closing stock-price. In this example, the plot 160 would represent a time series of the company's open stock price over time, plot 162 would represent a time series of the company's closing stock-price over time, and the metric plot 168 would represent the second company's opening stock-price minus the closing stock-price over time.

In the example illustrated in FIG. 1, the data objects 102, 152 and the time series 106, 108, 156, 158 are linked by the ontology 104, thus allowing the same metric 116 that plot 118 is based on for the first data object 102 associated with time series 106, 108 to be used to generate a similar plot 168 for time series 156, 158 associated with a second data object 152. In this example relating to stock prices, the first data object 102 has an object type of "company" and is linked via the ontology to a plurality of other data objects that are associated with the company. The other data objects may include a plurality of time series which have information related to the company, including a time series of the stock open price (series type "stock-price open"), a time series of the stock close price (series type "stock-price close"), and a time series of the stock volume (series type "stock-price volume"). The metric 116 is defined so that a corresponding plot 118 illustrates certain information that can be determined from time series that are associated with the first data object. Once the analyst is sufficiently defined the metric, and input is receipt of a second data object (a second company), the ontology can be used to determine for the second company the time series that have stock price information for the second company, e.g., the time series of the second company's stock open price, stock close price, and stock volume price. That is, the second company related time series of the stock open price (series type "stock-price open"), a time series of the stock close price (series type "stock-price close"), and a time series of the stock volume (series type "stock-price volume"). As one of ordinary skill in the art will appreciate, many other examples of such a "pivot" technique can be used to define the desired chart analysis related to a first data object, and then pivot the defined metric and associations to a second data object to produce a corresponding plot for analysis.

Figure 2:
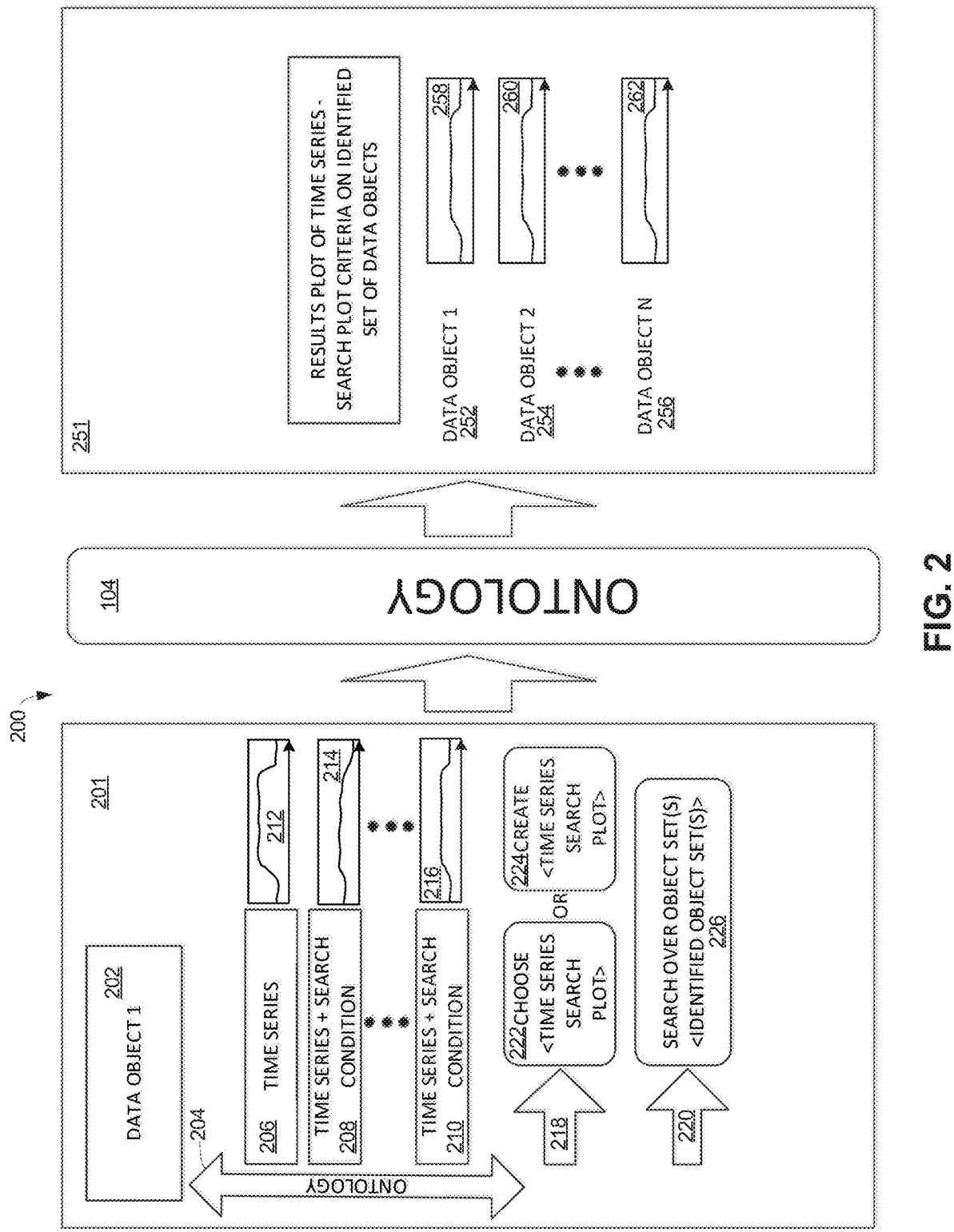
FIG. 2 illustrates an example of a schematic of an overview of multi time series search, including choosing or creating a time series search plot associated with an object set as a template, identifying a search object set, and pivoting the plot-based search to another time series data set associated with the identified search object set.

FIG. 2 illustrates an example of a schematic 200 of multi time series search functionality, including choosing or creating a time series search plot associated with an object set as a template, identifying a search object set, and pivoting the plot-based search to another time series data set associated with the identified search object set. Additional description applicable to the data objects, the ontology and time series is provided above with respect to the specific terms, and also in reference to FIGS. 3-5 below. In reference to FIG. 2, the first portion 201 generally refers to operations and functionality of determining a time series search plot template based on a search condition, and selecting an object set to run the search on, and the second portion 251 generally refers to operation and functionality of displaying plots and information resulting from performing the search on time series associated with the selected object set. For example, using a computational tree that defines a first data object, conditions and associated time series in the first portion 101 on a second data object and its similarly associated time series with the same conditions in the second portion 251 for a multi series search. An example of a user interface that facilitates the operations and functionality described in reference to FIG. 2 is described in reference to FIG. 9.

The schematic 200 illustrates a first portion 201 of processes and functionality, a second portion 251 of processes and functionality, and an ontology 104. The first portion 201 relates to presenting on a display a user interface configured to allow a user to select a time series search plot related to a data object as a template, or to create the desired time series search plot, identify an object set (e.g., a set of data objects) on which to apply the search template, and run a multi time series search on the identified object set to produce plots related to the data objects in the object set and corresponding to the search plot. For example, as illustrated in the embodiment of FIG. 2, a first data object 202 is associated with a first time series 206 and a second time series 208 by the ontology 104. The ontology 104 defines relationships between the first data object 202 in the time series 206, 208, for example relationships among object types of the data object 202 and series types of the time series 206, 208. In operation, after a first data object 202 is selected, time series that are associated with the first data object 202 may be displayed on a user interface. A search condition is then received by the system, the search condition indicating criteria for information to search for in the time series. The first time series 206 as searched in accordance with a first search condition may be represented by a first plot 212. The second time series 208 as searched in accordance with a second search condition may be represented by a second plot 214. The plots 212, 214, and one or more additional plots, may represent an intermediate step where an analyst is trying various search conditions and the results are displayed on the user interface to help an analyst consider what information may be useful to extract from the time series that are related to the first data object 202, and to extract from other time series.

The first portion 201 also illustrates an input 218 may be received by a user interface, the input 218 indicating a selection of a time series search plot 222 that will be used for a multi time series search or information indicating that the analyst wants to continue defining the search, for example, revised search conditions. Input 220 is then received to indicate a set of data objects 226 on which the search will be conducted. In portion 251, on a user interface the system displays a resulting search plot 258, 260, 262, each search plot corresponding to a data object 252, 254, 256 that was identified in portion 201 is a data object in the set of objects to be searched. This multi time series search functionality further described in reference to FIG. 9, which illustrates one embodiment of a user interface for conducting a multi time series search.

In the example illustrated in FIG. 2, the data objects 202, 252, 254, 256 and the time series 206, and time series represented by time series search plots 258, 260, 262 are linked by the ontology 104. Through the ontology, the same search condition that was applied to generate search plot 216 from time series 210 associated with data object 202, is used to generate search plots 258, 260, and 262 from times series associated with data objects 252, 254, 256. The multi time series search functionality uses the ontology to identify time series that are linked to the set of data objects being searched in the same way as time series 210 is linked to the first data object 202. Multi time series search functionality then applies the search condition the identified time series, and time series that meet the criteria of the search condition are displayed in portion 251. As one of ordinary skill in the art will appreciate, many other examples of such a "pivot" technique can be used to generate a plot using certain search conditions, and then pivot to apply the same search conditions to time series that are associated with data objects that are in the identified object set to be searched, and generate corresponding plots.

Object-Centric Data Model

Figure 3:
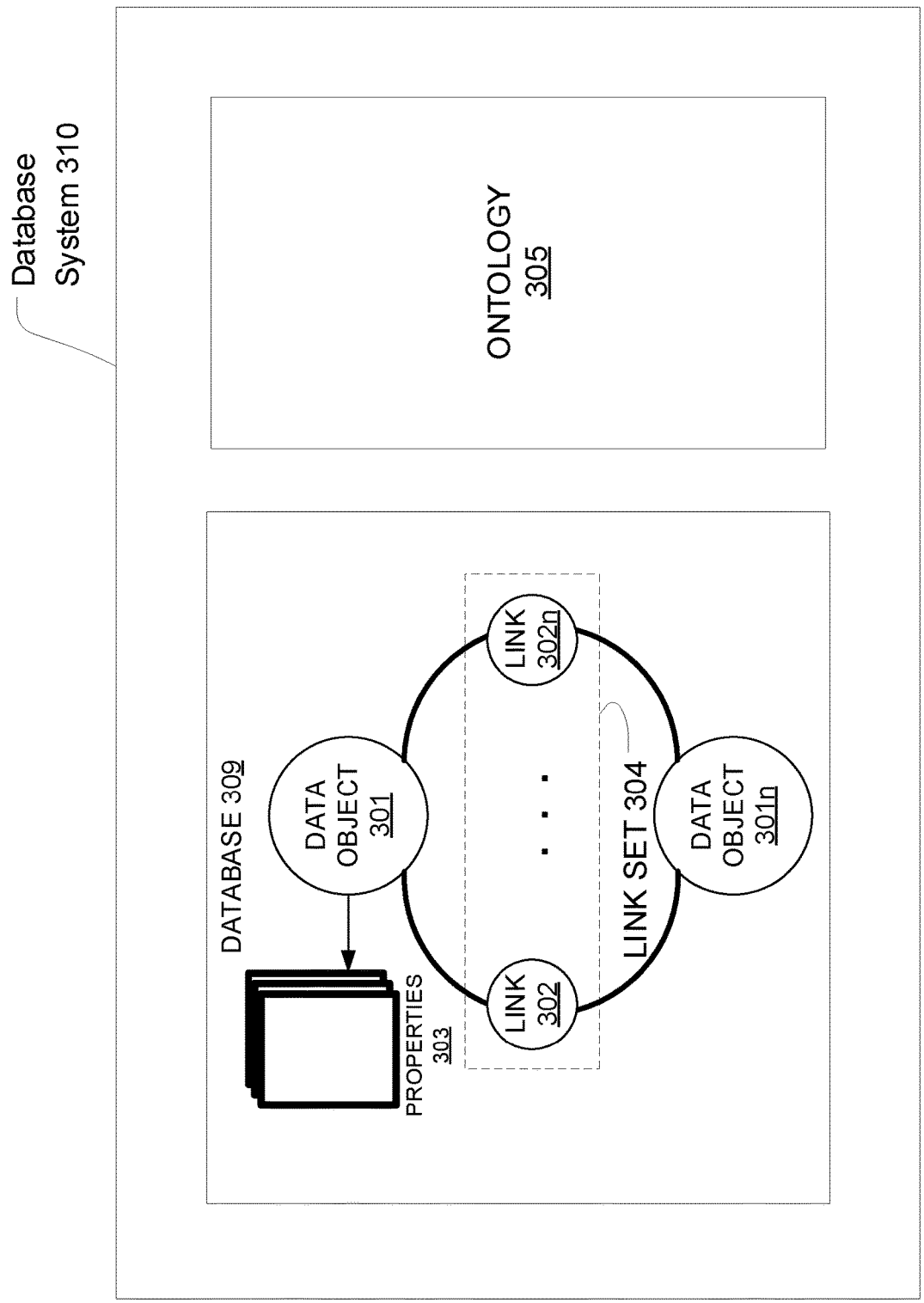
FIG. 3 illustrates one embodiment of a database system using an ontology.

FIG. 3 illustrates one embodiment of a database system using an ontology. An ontology may provide a data model for storage of time series data and information. To provide a framework for the discussion of specific systems and methods described herein, an example database system 310 using an ontology 305 will now be described in reference to FIG. 3. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 305. The conceptual data model is independent of any particular database used for durably storing one or more database(s) 309 based on the ontology 305. For example, each object of the conceptual data model may correspond to one or more rows in a relational database or an entry in Lightweight Directory Access Protocol (LDAP) database, or any combination of one or more databases.

FIG. 3 also illustrates an object-centric conceptual data model according to an embodiment. An ontology 05, as noted above, may include stored information providing a data model for storage of data in the database 309. The ontology 305 may be defined by one or more object types, which may each be associated with one or more property types. At the highest level of abstraction, data object 301 is a container for information representing things in the world. For example, data object 301 can represent an entity such as a person, a place, an organization, a market instrument, or other noun. Data object 301 can represent an event that happens at a point in time or for a duration. Data object 301 can represent a document or other unstructured data source such as an e-mail message, a news report, or a written paper or article. Each data object 301 is associated with a unique identifier that uniquely identifies the data object within the database system.

Different types of data objects may have different property types. For example, a "Person" data object might have an "Eye Color" property type and an "Event" data object might have a "Date" property type. Each property 303 as represented by data in the database system 310 may have a property type defined by the ontology 305 used by the database 309.

Objects may be instantiated in the database 309 in accordance with the corresponding object definition for the particular object in the ontology 305. For example, a specific monetary payment (e.g., an object of type "event") of US$30.00 (e.g., a property of type "currency") taking place on Mar. 27, 2009 (e.g., a property of type "date") may be stored in the database 309 as an event object with associated currency and date properties as defined by the ontology 305. In another example of an event object, a batch (e.g., an object of type "batch") in a process step or location in the process (e.g., a property of type "event") starting on Mar. 27, 2009 (e.g., a property of type "date") at 0805:00 (e.g., a property of type "start time") and completing on Mar. 27, 2009 (e.g., a property of type "date") at 1515:15 (e.g., a property of type "time") on (or monitored by) system_1 (e.g., a property type of "system"). In another example, a specific sensor (e.g., an object of type "sensor") used in a system (e.g., a property of type "system") can collect time series data (e.g., a property of type "data") along with times associated with the data (e.g., a property of type "time"). The data objects defined in the ontology 305 may support property multiplicity. In particular, a data object 301 may be allowed to have more than one property 303 of the same property type. For example, a "Person" data object might have multiple "Address" properties or multiple "Name" properties. In another example, a batch in a process run may have multiple "sensor" properties indicating that multiple sensors collected monitored the batch to collect time series data.

Each link 302 represents a connection between two data objects 301. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. In one embodiment, when two data objects are connected by an event, they may also be connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In another example, two "Batch" data objects representing two batches that were monitored by the same system may both have a "Sensor" property that indicates the sensor that was used to monitor each of the batches. If both batches were monitored by the same system (e.g., at different times), then both batches may have one or more "Sensor" properties that are likely similar, if not identical, indicating one or more of the same sensors were used to collect time series data for each of the batches. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 301 can have multiple links with another data object 301 to form a link set 304. For example, two "Person" data objects representing a husband and a wife could be linked through a "Spouse Of" relationship, a matching "Address" property, and one or more matching "Event" properties (e.g., a wedding). In another example of matching event properties, two or more batches can include one or more of the same event properties, which indicates the tool more batches have undergone the same event. Accordingly, by selecting a group of batches and selecting an event which is common to each batch in the group of batches, time series data for each of these batches may be displayed in a user interface in one or more plots such that it is temporally aligned for comparison. The time series data may include one or more time series sensor data. In an example, the temporal alignment of a first plot of time series data to a second plot of time series data aligns a portion of a first subset of time series data with a portion of a second subset of time series data in the chart in a vertical or horizontal corresponding direction such that points of the first plot and the second plot along the corresponding direction represent the same point in time relative to the start of the respective first batch and second batch. Each link 302 as represented by data in a database may have a link type defined by the database ontology used by the database.

Figure 4:
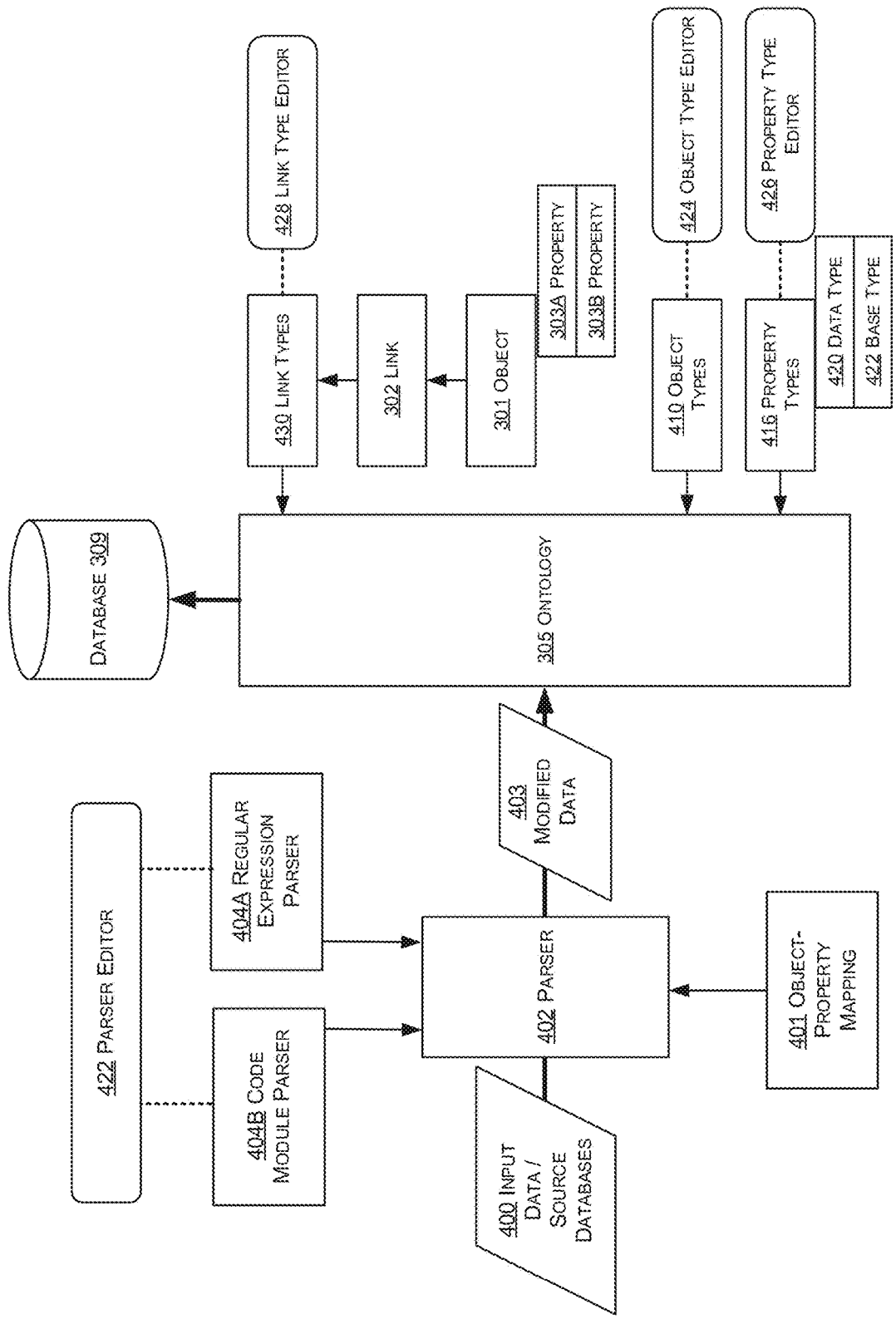
FIG. 4 illustrates one embodiment of a system for creating data in a data store using a dynamic ontology.

FIG. 4 illustrates one embodiment of a system for creating data in a data store using a dynamic ontology. In this example, the ontology may be configured, and data in the data model populated, by a system of parsers and ontology configuration tools. In the embodiment of FIG. 4, input data 400 is provided to parser 402. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. In another example, a system performing a process may be in communication with one or more databases with information about sensors that monitor the process and phases of the process. The databases may contain a variety of related information and attributes of each type of data, for example, related to multiple sensors that collect data during the process, phases of the process, data sensed by a sensor, time stamps of sensor data, and corresponding information related to the process or particular phases of the process. The parser 402 is able to read a variety of source input data types and determine which type of data it is reading.

In accordance with the discussion above, the example ontology 305 comprises stored information providing the data model of data for storage of data in database 309. The ontology 305 stored information provides a data model having one or more object types 410, one or more property types 416, and one or more link types 430. Based on information determined by the parser 402 or other mapping of source input information to object type, one or more data objects 301 may be instantiated in the database 309 based on respective determined object types 410, and each of the objects 301 has one or more properties 303 that are instantiated based on property types 416. Two data objects 301 may be connected by one or more links 302 that may be instantiated based on link types 430. The property types 416 each may comprise one or more data types 420, such as a string, number, etc. Property types 416 may be instantiated based on a base property type 422. For example, a base property type 422 may be "Locations" and a property type 416 may be "Home."

In an embodiment, a user of the system uses an object type editor 424 to create and/or modify the object types 410 and define attributes of the object types. In an embodiment, a user of the system uses a property type editor 426 to create and/or modify the property types 416 and define attributes of the property types. In an embodiment, a user of the system uses link type editor 428 to create the link types 430. Alternatively, other programs, processes, or programmatic controls may be used to create link types and property types and define attributes, and using editors is not required.

In an embodiment, creating a property type 416 using the property type editor 426 involves defining at least one parser definition using a parser editor 422. A parser definition comprises metadata that informs parser 402 how to parse input data 400 to determine whether values in the input data can be assigned to the property type 416 that is associated with the parser definition. In an embodiment, each parser definition may comprise a regular expression parser 404A or a code module parser 404B. In other embodiments, other kinds of parser definitions may be provided using scripts or other programmatic elements. Once defined, both a regular expression parser 404A and a code module parser 404B can provide input to parser 402 to control parsing of input data 400.

Using the data types defined in the ontology, input data 400 may be parsed by the parser 402 determine which object type 410 should receive data from a record created from the input data, and which property types 416 should be assigned to data from individual field values in the input data. Based on the object-property mapping 401, the parser 402 selects one of the parser definitions that is associated with a property type in the input data. The parser parses an input data field using the selected parser definition, resulting in creating new or modified data 403. The new or modified data 403 is added to the database 309 according to ontology 305 by storing values of the new or modified data in a property of the specified property type. As a result, input data 400 having varying format or syntax can be created in database 309. The ontology 305 may be modified at any time using object type editor 424, property type editor 426, and link type editor 428, or under program control without human use of an editor. Parser editor 422 enables creating multiple parser definitions that can successfully parse input data 400 having varying format or syntax and determine which property types should be used to transform input data 400 into new or modified input data 403.

A user interface may show relationships between data objects. Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, a user interface may allow various other manipulations. For example, the objects within a database 309 may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data in a more analytically useful way. Graphical user interfaces allow the user to visualize otherwise difficult to define relationships and patterns between different data objects. In the example of a system performing a process numerous times and being in communication with one or more databases with information about sensors that monitor the process and phases of the process, a graphical user interface can display time series sensor data of one or more sensors for corresponding times in selected processes at selected times to compare the sensor data from process to process. That is, the time series sensor data for two or more processes can be displayed in a plot in a relative time scale such that the data at the beginning of each plot is aligned to be at the same point in the process to help identify differences in the processes. Such time series sensor data has been parsed and stored in one or more data objects with properties and relationships as defined by an ontology. This allows a user, through the user interface, to quickly and easily select for display in one or more plots aligned time series sensor data of certain sensors, processes (or batches), systems etc., and at a desired scale/time period of the displayed. The present disclosure allows for easier comparison of time series data that was generated at times, and/or in different systems. The present disclosure also allows faster analysis of time series data by allowing quick and accurate access to selected portions of time series sensor data which may have been collected by different sensors in different systems, or the same sensors of the same system but during different processes of a repetitively run process. Without using the present disclosure, quickly selecting, displaying, and analyzing time series data, and making use of known relationships associated with time series data, would be virtually impossible given the size and diversity of many users' present databases, (e.g. excel spreadsheets, emails, and word documents).

Figure 5:
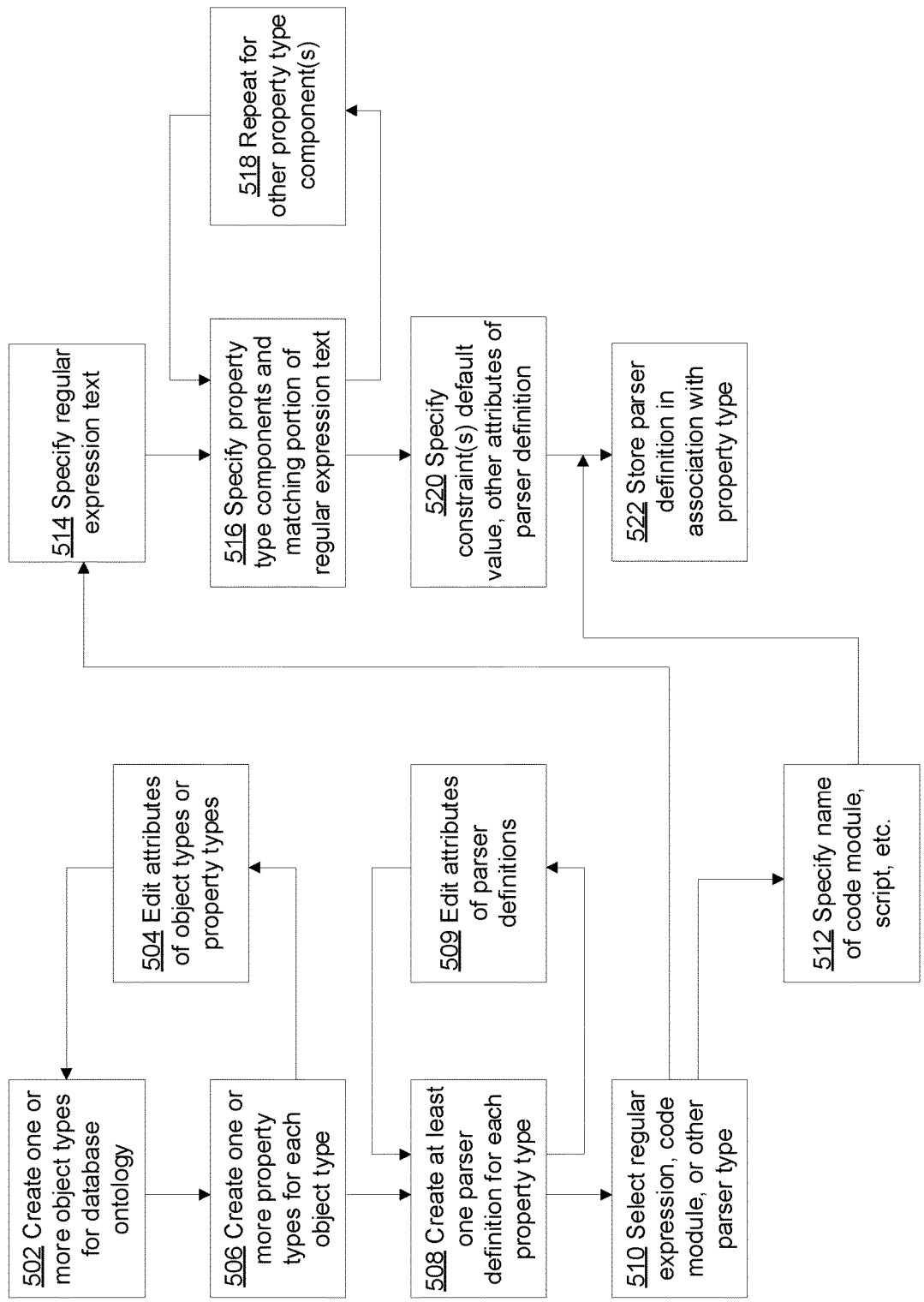
FIG. 5 illustrates defining a dynamic ontology for use in creating data in a data store.

FIG. 5 illustrates defining a dynamic ontology for use in creating data in a database. For purposes of disclosing a clear example, operations that may be used to define a dynamic ontology are illustrated in blocks 502-509 of FIG. 5, and are first described at a high level, and details of an example implementation follow the high level description. Although the operations may be referred to herein as "steps," (e.g., steps 502, 504, 506, etc.), unless indicated otherwise, these operations may be performed multiple time, for example, as loops as illustrated in FIG. 5. Also, in an embodiment, these operations may be performed in a different order, and/or there may be fewer operations or less operations.

In step 502, one or more object types are created for a database ontology. In step 506, one or more property types are created for each object type. As indicated in step 504, the attributes of object types or property types of the ontology may be edited or modified at any time.

In step 508, at least one parser definition is created for each property type. At step 509, attributes of a parser definition may be edited or modified at any time.

In an embodiment, each property type is declared to be representative of one or more object types. A property type is representative of an object type when the property type is intuitively associated with the object type. For example, a property type of "Social Security Number" may be representative of an object type "Person" but not representative of an object type "Business."

In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane". An example parser definition specifies an association of input data to object property components as follows: {LAST_NAME}, {FIRST_NAME}→Name:Last, Name: First. In an embodiment, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane". The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. Example selected attributes that can be displayed in object editor panel include an object type name (e.g., Business, Asset, etc.), a uniform resource identifier (URI) specifying a location of information defining the object type (for example, "com. business_entity_name.object.business"), and a base type of the object type, also expressed in URI format (for example, "com. business_entity_name. object.entity"). Each URI also may include a graphical icon.

In an embodiment, a user interacts with a computer to perform the following steps to define an object type. Assume for purposes of an example that the new object type is Batch. Using the object type editor, the user selects the "Add Object Type" button and the computer generates and displays a panel that prompts the user to enter values for a new object type. The user selects a base object type of Entity, which may comprise any person, place or thing. The user assigns a graphical icon to the Batch object type. The user assigns a display name of "Batch" to the object type.

In an embodiment, a user interacts with the computer to define a property type in a similar manner. For example, the user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property.

In various embodiments, validators may comprise regular expressions, a set of fixed values, or a code module. For example, a property type that is a number may have a validator comprising a regular expression that matches digits 0 to 9. As another example, a property type that is a US state may have a validator that comprises the set {AK, AL, CA . . . VA} of valid two-letter postal abbreviations for states. Validator sets may be extendible to allow a user to add further values. A property type may have component elements, and each component element may have a different validator. For example, a property type of "Address" may comprise as components "City", "State", and "ZIP", each of which may have a different validator.

In an embodiment, defining a property type includes identifying one or more associated words for the property type. The associated words support search functions in large database systems. For example, a property type of "Address" may have an associated word of "home" so that a search in the system for "home" properties will yield "Address" as one result.

In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 5, creating a parser definition for a property type at step 510 may comprise selecting a parser type such as a regular expression, code module, or other parser type. When the parser type is "code module," then at block 512 a user specifies the name of a particular code module, script, or other functional element that can perform parsing for the associated property type.

In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display may further comprises a Name text entry box that can receive a user-specified name for the parser definition.

When the parser type is "regular expression," steps 514-520 are performed. At step 514, regular expression text is specified. For example, when the Parser Type value of combo box is "Regular Expression," a screen display comprises an Expression Pattern text box that can receive a user entry of regular expression pattern text.

In step 516, a property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. As shown in step 518, specifying a property type component and sub-definition of regular expression text may be repeated for all other property type components of a particular property type.

In step 520, a user may specify one or more constraints, default values, and/or other attributes of a parser definition. The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified.

At step 522, the parser definition is stored in association with a property type. For example, selecting the SAVE button causes storing a parser definition based on the values entered in screen display. Parser definitions may be stored in database 309.

The approach of FIG. 5 may be implemented using other mechanisms for creating and specifying the values and elements identified in FIG. 5, and a particular GUI of is not required.

Advantageously, use of a dynamic ontology may allow a user to take advantage of an ontological data model, while not constraining himself or herself to a hard-coded ontology. Hard-coded ontologies can be overly simple (i.e., lacking detailed semantic properties, making classification difficult but limiting analysis) or overly complex (i.e., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontologies semantic properties.

Certain methods can be used to transform data and create the data in a database using a dynamic ontology. In one example, input data is received. In an embodiment, an input data file is received. The input data file may comprise a comma-separated value (CSV) file, a spreadsheet, XML or other input data file format. Input data may represent such file formats or any other form of input data.

An object type associated with input data rows of the input data may be identified, and one or more property types associated with input data fields of the input data are identified. Then, a row of data is read from the input data, and one or more field values are identified based on delimiters or other field identifiers in the input data. A set of parser definitions associated with the property type of a particular input data field may be selected. For example, metadata stored as part of creating a property type specifies a set of parser definitions, as previously described. The next parser definition can be applied to an input data field value. Thus, data fields are read from each row of the file and matched to each parser that has been defined for the corresponding property types. For example, assume that the mapping indicates that an input data CSV file comprises (Last Name, First Name) values for Name properties of Person objects. Data fields are read from the input data CSV file and compared to each of the parsers that has been defined for the Name property type given the First Name field and Last Name field. If a match occurs for a (Last Name, First Name) pair value to any of the parsers for the Name property type, then the parser transforms the input data pair of (Last Name, First Name) into modified input data to be stored in an instantiation of a Name property.

If applying a definition at results in a match to the input data, a property instance is created, and the input data field value is stored in a property of the property type associated with the matching sub-definition of the parser definition. For example, assume that the input data matches the regular expression for an ADDRESS value. The mapping specifies how to store the data matching each grouping of the regular expression into a component of the ADDRESS property. In response, an instance of an ADDRESS property is created in computer memory and the matching modified input data value is stored in each component of the property instance.

If no match occurs, then a test may be performed to determine whether other parser definitions match the same input data value. As an example, a property editing wizard in which multiple parsers have been created for a particular property, each of the multiple parsers can be used in matching input data. If no match occurs to the given parser definition, then any other parser definitions for that property type are matched until either no match occurs, or no other parser definitions are available.

If a grouping is empty, then the component is filled by the default value for that component, if it exists. If no other parser definitions are available, then an error is raised or the property is discarded. These preceding steps are repeated for all other values and rows in the input data until the process has transformed all the input data into properties in memory. After these steps are repeated for all other input data fields and rows, an object of the correct object type is instantiated. For example, the object-property mapping 401 may specify an object type for particular input data, and that type of object is instantiated. The newly created object is associated in memory with the properties that are already in memory. The resulting object is stored in the database.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

In various implementations, data objects in ontology 305 stored in database 309, may be stored as graphs or graph-like relationships (which may comprise data structures or databases), referred to collectively as "graphs." Some examples of graphs include an undirected graph, clusters, and adjacency lists that allow storing of graphs in memory efficiently, particularly where the graphs are lightly-connected graphs or clusters (e.g. graphs or clusters wherein the number of nodes is high compared to the number of linkages per node). Adjacency matrices may also allow for more efficient access and processing, particularly vectorized access and processing (e.g. using specialized hardware or processor instructions for matrix math), to the graph or cluster data because each matrix row corresponding to a node may have the same size irrespective of the number of linkages by node. As described here, various data items may be stored, processed, analyzed, etc. via graph-related data structures, which may provide various storage and processing efficiency advantages described. For example, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc.

The nodes of a graph may represent different information or data objects, for example. The edges of the graph may represent relationships between the nodes. The ontology may be created or updated in various ways, including those described herein, comprising both manual and automatic processes. In some implementations, the ontology and or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (i.e. node list) representation.

For the systems and methods described herein, for example in reference to FIGS. 1, 2, 8, 9, and 10, an ontology provides a data model for storage of time series data objects in association to other data objects. By recognizing the ontological relationships and links between a first data object and one or more time series data objects, a search can be determined for a first data object and one or more associated time series, and then a similar search can be performed on a second data object and it's one or more associated time series, a process sometimes referred to herein as "pivoting." FIG. 6 further illustrates how an ontology, as described in reference to FIGS. 3-5, facilitates searches that are defined in relation to the first data object and then pivoted to allow similar searching on a second data object or a set of data objects.

Figure 6:
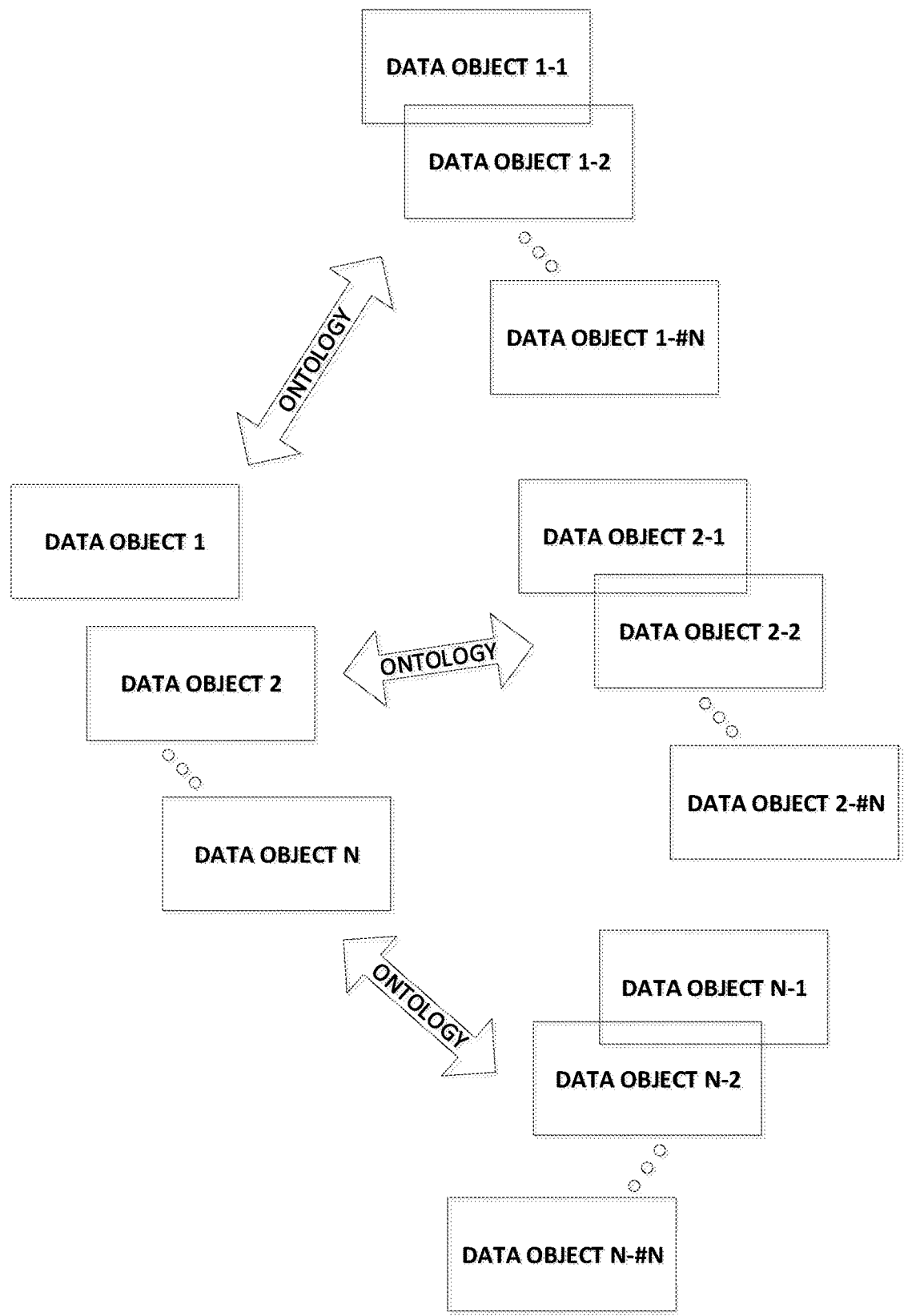
FIG. 6 illustrates an example of multiple data objects each associated by an ontology to a plurality of data objects.

In the example illustrated in FIG. 6, data object 1 is associated by an ontology to a plurality of data objects 1-1, 1-2, 1-#*n* which are time series. Similarly, data object 2 is associated by an ontology to a plurality of data objects 2-1, 2-2, 2-#*n* which are time series, and data object 3 is associated by an ontology to a plurality of data objects 3-1, 3-2, 3-#*n* which are time series. The ontology includes a defined "type" of the data object 1, 2 and 3, and a defined type of the data objects 1-1, 1-2, 1-#*n*, 2-1, 2-2, 2-#*n*, and 3-1, 3-2, 3-#*n*. Via the ontology, the type of the data objects in FIG. 6 is known, and the association of numerous time series data objects and other data objects is also known. Thus, when a search is determined using first data object and one or more associated time series data objects, the type of the first data object in the types of the time series data objects are known in the relationships between the data object is also known. Accordingly, using the ontology information for the first data object and its associated time series, once a search has been defined (e.g., with search conditions defined, selected data object(s) to be searched), the corresponding time series for the selected data objects to be searched can be determined and the search performed using the define search conditions.

Figure 7:
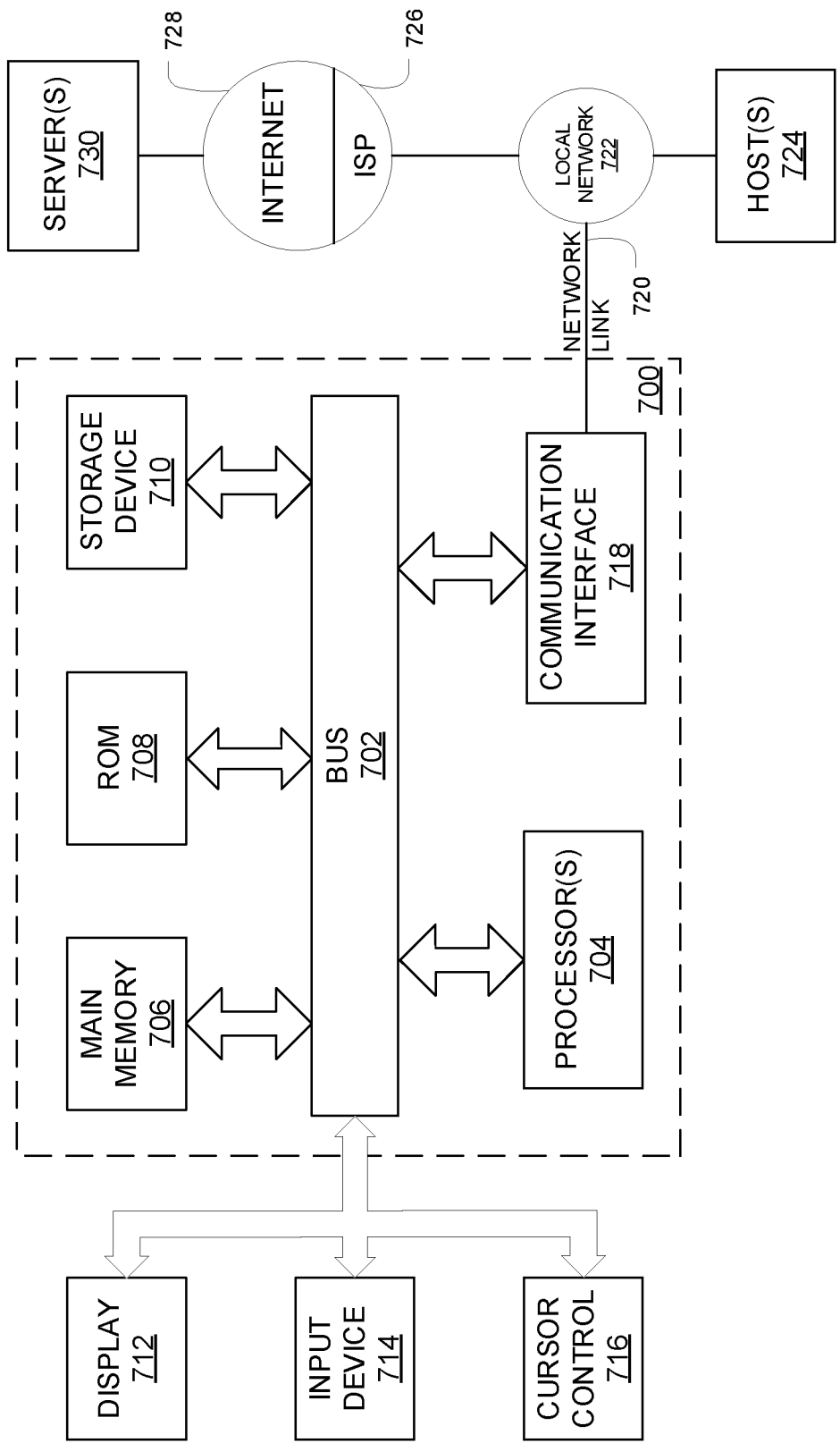
FIG. 7 is an example of an embodiment of a computer system that can implement the embodiments described herein.

FIG. 7 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. The main memory 706 may, for example, include instructions to allow a user to manipulate time series data to store the time series data in data objects as defined by an ontology, as described in reference to FIGS. 3-6.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Accordingly, in some embodiments, of the computer system 700, the computer system 700 comprises one or more non-transitory computer storage mediums 710 configured to at least a plurality of data objects, the data objects associated with respective object types; a plurality of time series, the time series associated with respective series types, the time series further associate with respective data objects; an ontology defining relationships among object types and series types; and computer-executable instructions. The computer system 700 further comprises one or more computer hardware processors 704 in communication with the one or more non-transitory computer storage mediums 710, the one or more computer hardware processors 704 configured to execute the computer-executable instructions to at least: cause presentation of a user interface configured to receive a first user input defining a metric that indicates a relationship between at least a first time series and a second time series that are each associated with at least a first data object of the plurality of data objects; generate and show on the display 712, in the user interface, a first plot depicting the metric as determined from the first time series and the second time series; receive, via the user interface, a second user input comprising a selection of a second data object of the plurality of data objects; determine, via the ontology, a relationship of the second data object with a third time series and a fourth time series that, respectively, are associated with series types that match series types associated with the first time series and the second time series; and generate and show on the display 712, in the user interface, a second plot depicting the metric as determined from the third time series and the fourth time series. The computer system 700 can include many other aspects. In an embodiment, the one or more computer hardware processors 704 of the computer system 700 are further configured to execute the computer-executable instructions to determine the series types of the first time series and the second time series, and determine, via the ontology, the third time series and the fourth time series based on the second data object and the determined series types of the first time series and the second time series. In an embodiment, the one or more computer hardware processors 704 of the computer system 700 are further configured to execute the computer-executable instructions to generate show in the display 712, in the user interface, a third plot representative of the first time series and a fourth plot representative of the second time series. In an embodiment, the one or more computer hardware processors 704 of the computer system 700 are further configured to execute the computer-executable instructions to receive, via the user interface, a user selection that identifies the first time series and second time series. In an embodiment, the one or more computer hardware processors 704 of the computer system 700 are further configured to execute the computer-executable instructions to receive, prior to receiving the second user input, one or more additional user inputs changing the defined metric, and generate and display, in the user interface, the first plot depicting the metric as defined by the one or more additional user inputs.

Figure 8:
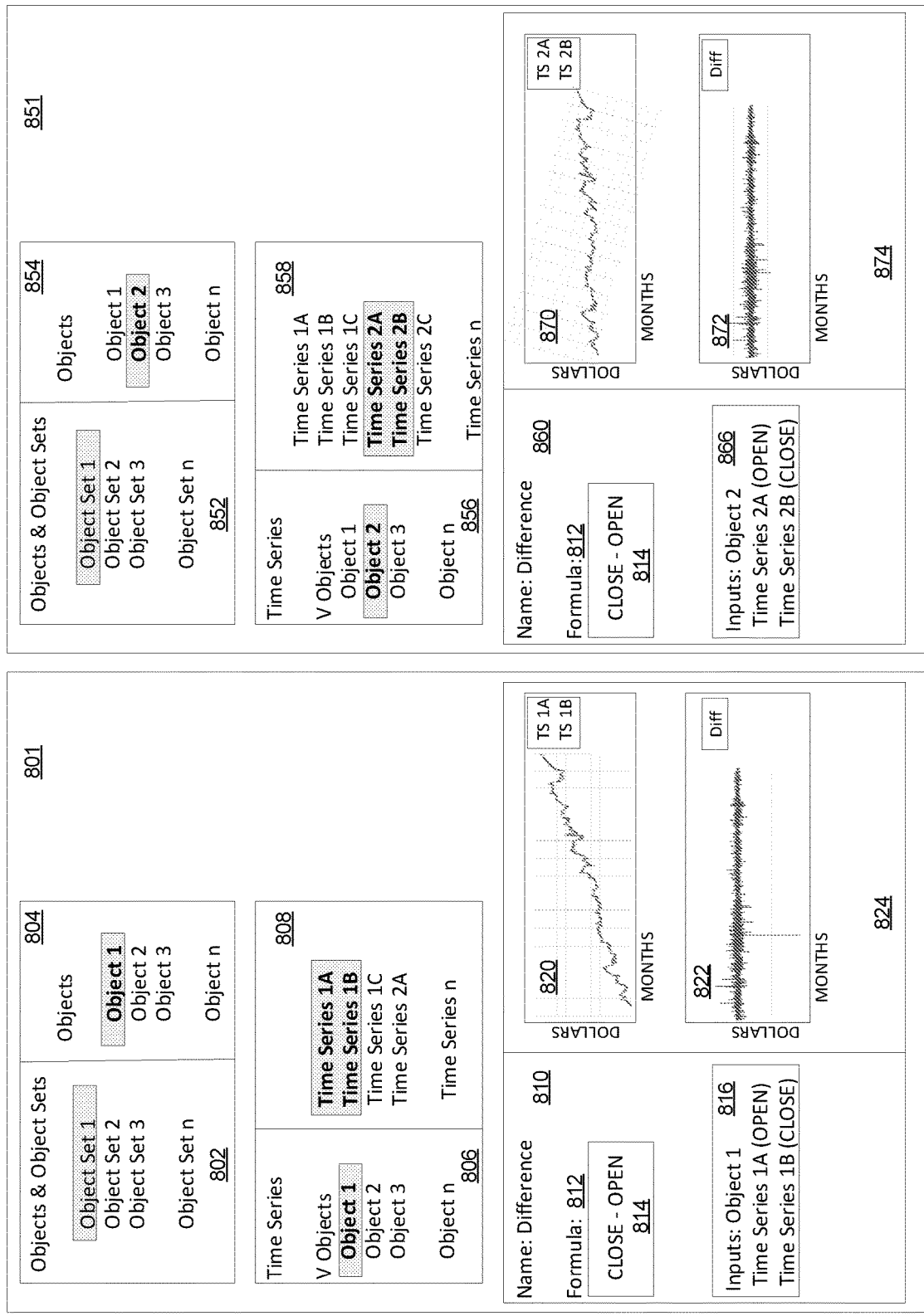
FIG. 8 illustrates an example of one embodiment of a user interface of a system configured to use a metric that indicates a relationship between time series and a first data object to generate a first plot, and then based on ontology, generate and display a second plot depicting the metric is determined from time series associated with a second data object.

FIG. 8 illustrates an example of a user interface, and subpanels and items that may be displayed on a user interface on a system configured to use a metric defining a relationship between two or more time series associated with a first data object to generate a first plot, and then based on ontology, generate and display a second plot using the same metric but applied to two or more time series associated with the second data object. In various embodiments, some of the subpanels and items may not be displayed, and/or other subpanels and items that are not illustrated and described may be displayed.

Panel 801 shows examples of subpanels and items that may be displayed on a user interface to select two or more time series related to a first data object, defining a metric indicating a calculation to be performed using the selected time series, and displaying a plot depicting the result of applying the metric to the selected time series. In this example, a subpanel 802 may be used to receive a selection of an object set, and subpanel 804 may be used to select a particular object (Object 1) from the object set. Using the previous example, the Object Set 1 may include a plurality of companies, Object 1 indicating a particular company. Subpanel 806 shows the selected Object 1 and subpanel 808 list time series that are related to the objects listed in subpanel 806. Here, selected Time Series 1A and Time Series 1B are data objects related to Object 1. In this example, Time Series 1A includes opening stock-price data and Time Series 1B includes closing stock-price data for the particular company indicated by Object 1.

User input received in subpanel 810 may be used to defined the metric. In this example, the formula 812 is the difference between the closing stock price and the opening stock price The metric may be a formula 812 that is entered into field 814 by a user. In various embodiments, the formula 812 may define any calculation that can be done using the selected time series. Subpanel 816 illustrates the time series the metric will be applied to, in this example Time Series 1A and Time Series 1B, which are related to Object 1. Panel 824 provide visual examples of plots to help an analyst define the formula. For example, plot 820 depicts plots of Time Series 1A and Time Series 1B data. Plot 822 depicts the result of applying the formula 812 to the inputs and subpanel 816, the resulting plot 822 displaying the difference between Time Series 1A and 1B, i.e., the difference in the closing stock price and the opening stock price. As described above, an ontology defines associations and links between Object 1, and Time Series 1A and 1B.

Once the formula has been sufficiently defined, a second data object may be selected. Subpanels 852 and 854 illustrates an example of selecting a second data object, Object 2, which in this example is a second company. Using the ontology as defined for Object 1 and Time Series 1A and 1B, the system selects corresponding Time Series 2A and 2B that are linked to Object 2, which may optionally be illustrated in a subpanel 856 and 858. In this example, Time Series 2A and 2B include information on the opening and closing stock-price, respectively, of the second company. Subpanel 860 may display the formula 812 being used in subpanel 814, and also may display the object and the time series to which the formula is applied in subpanel 866. Subpanel 874 may display a plot 870 depicting the Time Series 2A and 2B, and a plot 872 depicting the results applying the formula 812 to Time Series 2A and 2B.

Figure 9:
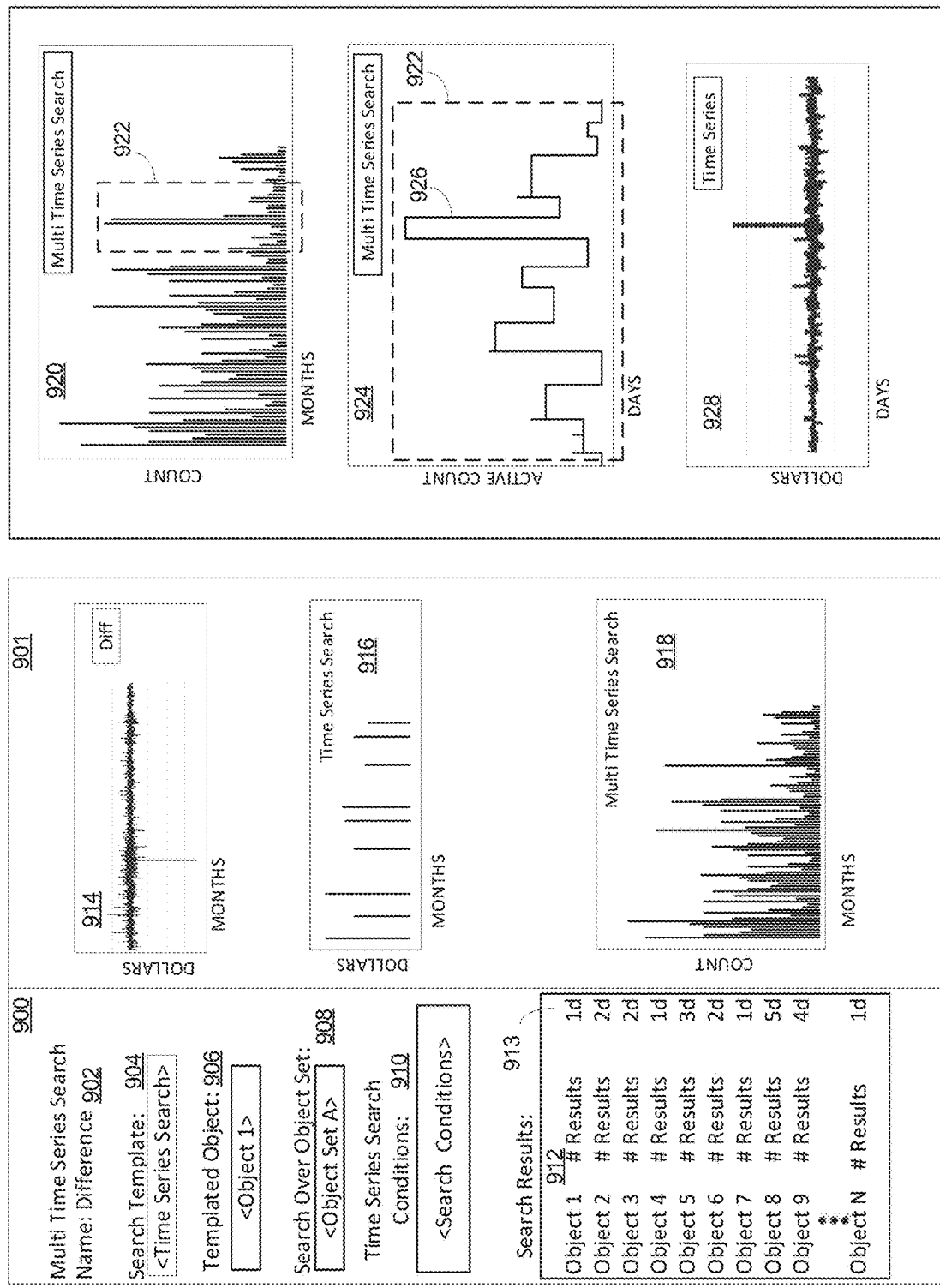
FIG. 9 illustrates an example of an embodiment of a user interface of a system that performs a search on one or more time series that are associated with data objects based on search conditions that are defined for a time series search associated with a different data object.

FIG. 9 illustrates an example of an embodiment of a user interface of a system that performs a search on two or more time series that are associated with a set of second data objects, based on a search condition defined for a time series associated with a first data object. FIG. 2 and the corresponding description also relates to this multi time series search functionality. Search functionality is made possible by the ontology that defines relationships between the first data object and associated time series, as described above in reference to FIG. 2 and FIGS. 3-5.

Subpanels 900 and 901 illustrates items that may be displayed in a user interface on a system configured to perform a multi time series search, in various embodiments. The items in subpanel 900 include a name 902 of the search which can be used to reference save search criteria at a later time. The items also include the type of search template 904, for example, a time series search template. A templated object 906 may also be displayed, indicating an object that is used by an analyst to determine what they want to search. Conditions of what the search is applied over 910 may also be shown. The templated object 906 and the search conditions 910 may be used by an analyst to determine how they want to conduct research. In other words, the analyst may select an object, enter various conditions, and see the results of these conditions on the templated object 906 in the form of one or more plots, for example, plots 914 and 916. The conditions define criteria that the analyst is looking for in time series those that are associated with a set of objects 908 to be searched. As result of applying the search conditions 910 the object set 908, a set of search results made be displayed as shown in subpanel 912. Also as illustrated in subpanel 912, for each of the objects was found to have time series the method conditions, a time period 913 may be indicated which represents the duration of time of when the conditions were met, for example, one day, 2 days, 3 days, 4 days, 5 days, etc. In some embodiments, as a result of searching time series that are each associated with one of the objects in the set of objects, a plot 918 may be displayed that indicates the accumulated search results over the set of objects. For example, plot 918 may represent a count across all the time series that were searched when the conditions 910 were met as a function of time.

Referring again to the example of stock prices, where the object set refers to a set of companies in the associated time series of the opening stock-price and the closing stock-price of each company, an analyst may want to determine when the difference between the closing price and the opening price of a stock exceeds a certain value. Plot 914 represents the closing stock price minus the opening price for a first company (Object 1). Plot 916 represents the instances, or events when the conditions 910 are applied, showing when the closing price minus the opening price exceeded a certain dollar value. For example, the lines in plot 916 represent the days when such conditions are met for the first company. Plot 918 represents a total count of the instances when difference between the closing stock price in the opening stock-price of any of the companies exceeds a certain value.

Accordingly, using the system and methods described herein, in analyst may define, in a template, conditions 910 to be searched across numerous time series that are each associated with a data object, refine the conditions 910, and visually review a resulting plot 916 that was generated based on a templated object 906 to ensure the conditions are correct. Then, the analyst may conduct a search of time series that are associated with the numerous objects, applying the same conditions 910 to each of the time series. Such functionality results in significant time savings for the analyst as the search conditions only need to be defined one time.

In another aspect, multi time series search functionality may be used to determine and analyze events in time series. Referring to begin to FIG. 9, plot 920 represents the results of performing a multi time series search, where the y-axis indicates a total count of the instances where conditions of a multi time series search when difference between the closing stock price in the opening stock-price of any of the companies exceeds a certain value.

For example, using the functionality described above, a multi time series search may be performed, and a plot 920 generated which represents the results of the multi time series search. Plot 920 displays a representation of the count of the events over time, similar to the way results are illustrated in plot 918. Box 922 indicates a set of counts in which in the event of interest may have occurred, as indicated by the large number of counts on a couple days. Plot 924 shows a representation of the counts in box 922 of plot 920 on a zoomed in scale. in this example, the spike 926 in plot 924 may be deemed to be an event to further analyze. For example, in some embodiments an analysis may be done to determine what conditions preceded the event, or followed the event (e.g., within a 3 day period before or after). In some embodiments, an analysis may be done on time series that may have helped contribute to the spike 926 and plot 924. Such time series may be temporally aligned with the time that the spike 926 occurred, as is shown in plot 928, and analyzed the time series analyzed. In some embodiments, two or more of the time series that contributed to spike 926 camp be temporally aligned and displayed in a user interface for analysis. In some embodiments, the time and duration of when the spike 926 occurred can be used in subsequent searches (e.g., searches with refined search conditions) where the search conditions include a time. Before and after the time thus allowing an analyst to drill down on time series data during in around the event to help provide insight on why the event may have occurred or events that resulted after the spike 926 occurred.

A stated above, the graphical user interface is an example of a user interface that is configured to take advantage of the underlying storage of data in accordance with an ontology, other graphical user interfaces with different pulldown menus that operate similarly are also contemplated. Using data objects that are stored on a computer storage medium, different time series user interfaces may be generated, each of the time series user interfaces including a chart illustrating plots of different portions of the time series data, for example, portions of time series data relating to one or more of various sensors, various batches, various events, various determined information, and/or various quality data. For example, other user interfaces can be configured such that the selection of a process (e.g., an event or a processing system), a material or particular type of sensor is used to generate a chart in a user interface that includes time series data associated with the selected process, material or sensor for multiple batches. Such user interfaces can facilitate easier analysis of large time series data sets because a user does not have to spend as much time indicating exactly what time series data needs to be presented in each plot. Instead, associations that have been generated when the time series data was processed in accordance with the ontology can be leveraged to display associated data of a process for multiple batches.

In various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Figure 10:
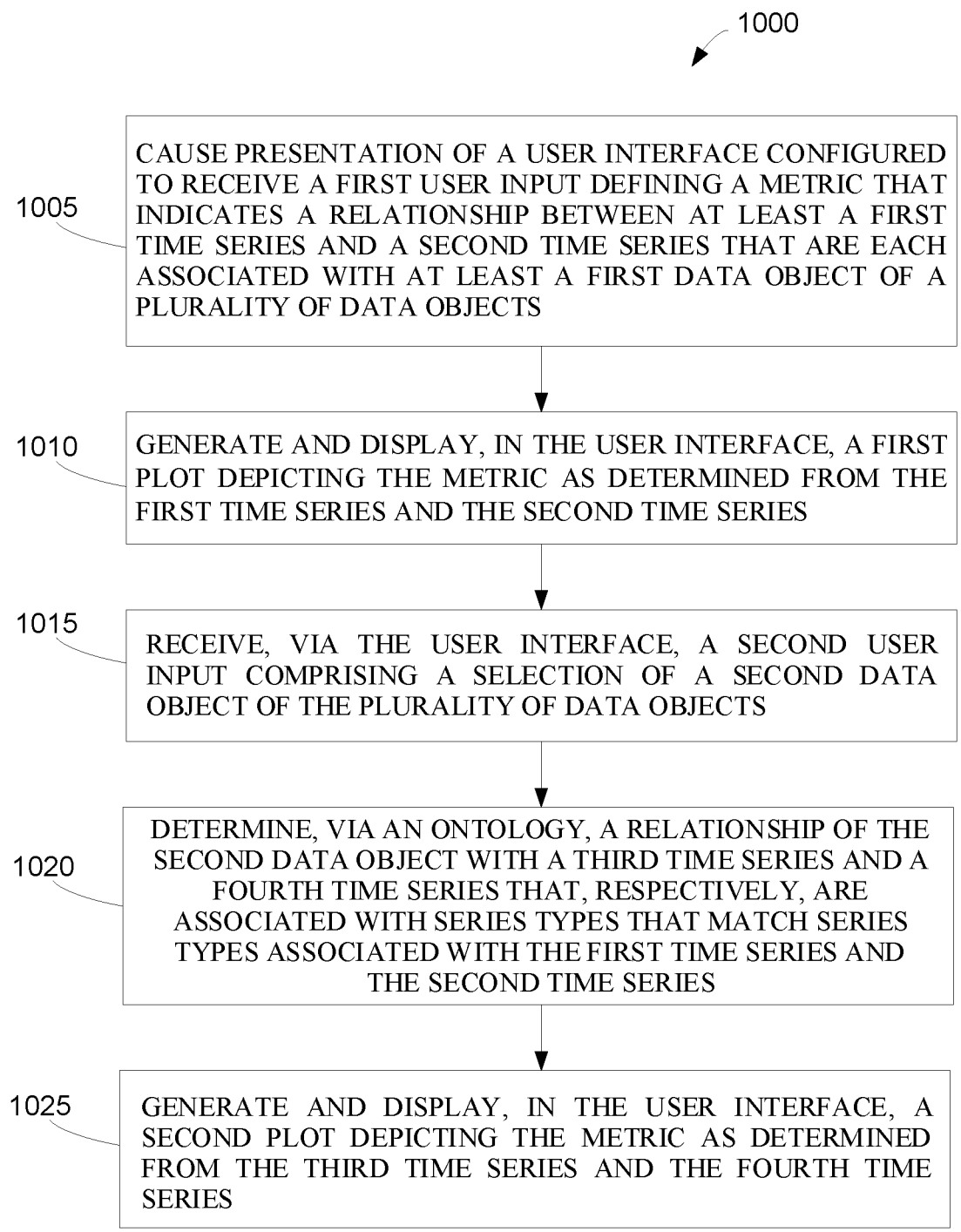
FIG. 10 is an example of a flowchart illustrating an embodiment of a process 1000 for visualizing and analyzing time series data sets.

FIG. 10 is an example of a flowchart showing a process 1000 for presenting and analyzing time series data in a user interface. The one or more processors 704 of the computer system 700 illustrated in FIG. 7 may perform the process 1000. Process 1000 illustrates an example of functionality that is described, for example, in reference to FIGS. 1 and 8. In various embodiments, process 1000 may include one or more other aspects, for example, any of the functionality described herein relating to FIGS. 1 and 8.

At block 1005, the process 1000 causes presentation of a user interface configured to receive a first user input defining a metric that indicates a relationship between at least a first time series and a second time series that are each associated with at least a first data object of a plurality of data objects. At block 1010, the process 1000 generates and displays, in the user interface, a first plot depicting the metric as determined from the first time series and the second time series. At block 1015, the process 1000 receives, via the user interface, a second user input comprising a selection of a second data object of the plurality of data objects. At block 1020, the process 1000 determines, via an ontology, a relationship of the second data object with a third time series and a fourth time series that, respectively, are associated with series types that match series types associated with the first time series and the second time series. Finally, at block 1025, the process 1000 generates and displays, in the user interface, a second plot depicting the metric as determined from the third time series and the fourth time series.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An apparatus comprising:
   one or more non-transitory computer storage mediums configured to store at least:
      two or more data objects of a plurality of data objects, the two or more data objects associated with respective object types;
      a plurality of time series, the time series associated with respective series types;
      an ontology defining relationships among object types and series types, wherein:
         the two or more data objects include at least a first data object of a first object type and a second data object of the first object type,
         each of the first and second data objects is associated with a respective set of two or more time series of the plurality of time series, and each of the sets of two or more time series includes at least a respective time series of a first series type and a respective time series of a second series type; and computer-executable instructions; and one or more computer hardware processors in communication with the one or more non-transitory computer storage mediums, the one or more computer hardware processors configured to execute the computer-executable instructions to configure the apparatus to at least:

cause presentation of a user interface configured to receive user input, the user interface including at least:
- a first portion configured to receive selection of data objects;
- a second portion configured to receive selection of time series;
- a third portion configured to receive specification of formulas; and
- a fourth portion configured to display graphical plots;

receive, via the first portion of the user interface, a first user input comprising a selection of the first data object;

receive, via the second portion of the user interface, a second user input comprising a selection of a first time series and a second time series that are associated with the first data object, wherein the first time series is of the first series type, and wherein the second time series is of the second series type;

receive, via the third portion of the user interface, a third user input comprising a specification of a formula defining a relationship between the first time series and the second time series;

apply the specified formula to the first and second time series to determine a first calculated time series;

generate and cause display, in the fourth portion of the user interface, of at least a first graphical plot depicting the first calculated time series;

receive, via first portion of the user interface, a fourth user input comprising a selection of the second data object;

in response to receiving the selection of the second data object:
- automatically determine, via the ontology, that both the first and second data objects are of the first object type;
- automatically determine, via the ontology, that the first and second time series are of the first and second series types, respectively;
- automatically identify, via the ontology, a third time series that is both (a) associated with the second data object and (b) of the first series type;
- automatically identify, via the ontology, a fourth time series that is both (a) associated with the second data object and (b) of the second series type;
- automatically cause display, in the user interface, of an indicator of the identified third and fourth time series;
- automatically apply the specified formula to the identified third and fourth time series to determine a second calculated time series; and
- automatically generate and cause display, in the fourth portion of the user interface, of at least a second graphical plot depicting the second calculated time series.

2. The apparatus of claim 1, wherein the at least the first graphical plot comprises two or more graphical plots, and wherein the one or more computer hardware processors are further configured to execute the computer-executable instructions to configure the apparatus to at least:

further response to receiving the selection of the second data object:
- automatically generate and cause simultaneous display, in the fourth portion of the user interface, of at least two or more second graphical plots.

3. The apparatus of claim 1, wherein the one or more computer hardware processors are further configured to execute the computer-executable instructions to configure the apparatus to at least:

generate and cause display, in the user interface, of a third graphical plot representative of the first time series and a fourth graphical plot representative of the second time series.

4. The apparatus of claim 3, wherein the first graphical plot, the third graphical plot, and the fourth graphical plot are displayed simultaneously and temporally aligned.

5. The apparatus of claim 1, wherein the one or more computer hardware processors are further configured to execute the computer-executable instructions to configure the apparatus to at least:

generate and cause display, in the user interface, of a fifth graphical plot representative of the third time series and a sixth graphical plot representative of the fourth time series.

6. The apparatus of claim 5, wherein the second graphical plot, the fifth graphical plot, and the sixth graphical plot are displayed simultaneously and temporally aligned.

7. The apparatus of claim 1, wherein the one or more computer hardware processors are further configured to execute the computer-executable instructions to configure the apparatus to at least:

generate and cause display, in the user interface, of the first graphical plot and the second graphical plot temporally aligned.

8. The apparatus of claim 7, wherein the first and second plots are displayed on a same graph.

9. A computer-implemented method for presenting time series, the computer-implemented method comprising:

by one or more computer hardware processors configured executing computer-executable instructions:

accessing one or more non-transitory computer storage mediums configured to store at least:
- two or more data objects of a plurality of data objects, the two or more data objects associated with respective object types;
- a plurality of time series, the time series associated with respective series types;
- an ontology defining relationships among object types and series types, wherein:
  - the two or more data objects include at least a first data object of a first object type and a second data object of the first object type,
  - each of the first and second data objects is associated with a respective set of two or more time series of the plurality of time series, and
  - each of the sets of two or more time series includes at least a respective time series of a first series type and a respective time series of a second series type;

causing presentation of a user interface configured to receive user input, the user interface including at least:
a first portion configured to receive selection of data objects;
a second portion configured to receive selection of time series;
a third portion configured to receive specification of formulas; and
a fourth portion configured to display graphical plots;

receiving, via the first portion of the user interface, a first user input comprising a selection of the first data object;

receiving, via the second portion of the user interface, a second user input comprising a selection of a first time series and a second time series that are associated with the first data object, wherein the first time series is of the first series type, and wherein the second time series is of the second series type;

receiving, via the third portion of the user interface, a third user input comprising a specification of a formula defining a relationship between the first time series and the second time series;

applying the specified formula to the first and second time series to determine a first calculated time series;

generating and causing display, in the fourth portion of the user interface, of at least a first graphical plot depicting the first calculated time series;

receiving, via first portion of the user interface, a fourth user input comprising a selection of the second data object;

in response to receiving the selection of the second data object:
automatically determining, via the ontology, that both the first and second data objects are of the first object type;
automatically determining, via the ontology, that the first and second time series are of the first and second series types, respectively;
automatically identifying, via the ontology, a third time series that is both (a) associated with the second data object and (b) of the first series type;
automatically identifying, via the ontology, a fourth time series that is both (a) associated with the second data object and (b) of the second series type;
automatically causing display, in the user interface, of an indicator of the identified third and fourth time series;
automatically applying the specified formula to the identified third and fourth time series to determine a second calculated time series; and
automatically generating and causing display, in the fourth portion of the user interface, of at least a second graphical plot depicting the second calculated time series.

10. The computer-implemented method of claim 9, wherein the at least the first graphical plot comprises two or more graphical plots, and wherein the computer-implemented method further comprises:
by the one or more computer hardware processors configured executing computer-executable instructions:
further response to receiving the selection of the second data object:
automatically generating and causing simultaneous display, in the fourth portion of the user interface, of at least two or more second graphical plots.

11. The computer-implemented method of claim 9 further comprising:
by the one or more computer hardware processors configured executing computer-executable instructions:
generating and causing display, in the user interface, of a third graphical plot representative of the first time series and a fourth graphical plot representative of the second time series.

12. The computer-implemented method of claim 11, wherein the first graphical plot, the third graphical plot, and the fourth graphical plot are displayed simultaneously and temporally aligned.

13. The computer-implemented method of claim 9 further comprising:
by the one or more computer hardware processors configured executing computer-executable instructions:
generating and causing display, in the user interface, of a fifth graphical plot representative of the third time series and a sixth graphical plot representative of the fourth time series.

14. The computer-implemented method of claim 13, wherein the second graphical plot, the fifth graphical plot, and the sixth graphical plot are displayed simultaneously and temporally aligned.

15. The computer-implemented method of claim 9 further comprising:
by the one or more computer hardware processors configured executing computer-executable instructions:
generating and causing display, in the user interface, of the first graphical plot and the second graphical plot temporally aligned.

16. The computer-implemented method of claim 15, wherein the first and second plots are displayed on a same graph.

* * * * *